(12) United States Patent
Pong

(10) Patent No.: US 7,941,613 B2
(45) Date of Patent: May 10, 2011

(54) SHARED MEMORY ARCHITECTURE

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 759 days.

(21) Appl. No.: 11/807,986

(22) Filed: May 31, 2007

(65) Prior Publication Data
US 2008/0301379 A1    Dec. 4, 2008

(51) Int. Cl.
*G06F 12/00*    (2006.01)
(52) U.S. Cl. ........................................ 711/148; 709/224
(58) Field of Classification Search .................. 711/148; 709/214
See application file for complete search history.

(56) References Cited

U.S. PATENT DOCUMENTS

| | | | |
|---|---|---|---|
| 5,940,870 A * | 8/1999 | Chi et al. ..................... | 711/206 |
| 7,200,144 B2 * | 4/2007 | Terrell et al. .................. | 370/389 |
| 7,281,055 B2 * | 10/2007 | Glasco et al. ................. | 709/232 |
| 7,480,303 B1 * | 1/2009 | Ngai ........................... | 370/395.5 |
| 2002/0016891 A1 * | 2/2002 | Noel et al. ..................... | 711/153 |
| 2003/0037178 A1 * | 2/2003 | Vessey et al. .................. | 709/319 |
| 2005/0005074 A1 * | 1/2005 | Landin et al. ................. | 711/148 |
| 2005/0091383 A1 * | 4/2005 | Bender et al. ................. | 709/228 |
| 2006/0292292 A1 * | 12/2006 | Brightman et al. ............. | 427/66 |

* cited by examiner

*Primary Examiner* — Hashem Farrokh
(74) *Attorney, Agent, or Firm* — Brake Hughes Bellermann LLP

(57) ABSTRACT

Disclosed herein is an apparatus which may comprise a plurality of nodes. In one example embodiment, each of the plurality of nodes may include one or more central processing units (CPUs), a random access memory device, and a parallel link input/output port. The random access memory device may include a local memory address space and a global memory address space. The local memory address space may be accessible to the one or more CPUs of the node that comprises the random access memory device. The global memory address space may be accessible to CPUs of all the nodes. The parallel link input/output port may be configured to send data frames to, and receive data frames from, the global memory address space comprised by the random access memory device(s) of the other nodes.

12 Claims, 7 Drawing Sheets

SHARED MEMORY ARCHITECTURE

TECHNICAL FIELD

This description relates to computing systems.

BACKGROUND

Computing systems may be built on a cluster of autonomous servers, and may be connected to each other by switches, such as Ethernet switches. The servers may communicate with each other by sending and receiving messages. It is desirable to reduce the latency and increase the bandwidth of computing systems.

SUMMARY

According to one general aspect, an apparatus includes a plurality of nodes. Each of the plurality of nodes includes one or more central processing units (CPUs), a random access memory device, and a parallel link input/output port. The random access memory device includes a local memory address space and a global memory address space. The local memory address space is accessible to the one or more CPUs of the node that comprises the random access memory device. The global memory address space is accessible to CPUs of all the nodes. The parallel link input/output port is configured to send data frames to, and receive data frames from, the global memory address space comprised by the random access memory device(s) of the other nodes.

According to another general aspect, an apparatus includes a plurality of nodes and a switch for routing a frame between the nodes. Each of the plurality of nodes includes a central processing unit (CPU) for writing the frame to a local memory address space, a memory divided between the local memory address space and a global memory address space associated with a global address, a protocol engine, and a parallel link input/output port. The protocol engine is configured to instruct the parallel link input/output port to prepend a routing header onto the frame stored in the local memory address space and send the frame out of the node through the parallel link input/output port. The protocol engine is also configured to receive the frame through the parallel link input/output port and write the frame to the global memory address space based on the routing header including the global memory address associated with the global memory address space. The parallel link input/output port is configured to prepend the routing header onto the frame, strip the routing header from the frame, and route the frame between the protocol engine and the switch. The switch is configured to route the frame between the plurality of nodes.

According to another general aspect, a system includes a plurality of nodes. Each operates under an independent operating system and includes a memory including a local memory accessible to the node and a global memory accessible to all the nodes in the system.

According to another general aspect a memory manager is configured to load onto a operating system of each of a plurality of nodes and partition a memory of each of the nodes into a local memory accessible to the node and a global memory accessible to all of the plurality of nodes.

Implementations can include one or more of the following features. For example, each node may include a bus. In another example, the parallel link input/output port may include a HyperTransport port or PCI Express port.

The details of one or more implementations are set forth in the accompanying drawings and the description below. Other features will be apparent from the description and drawings, and from the claims.

DETAILED DESCRIPTION

Figure 1A:
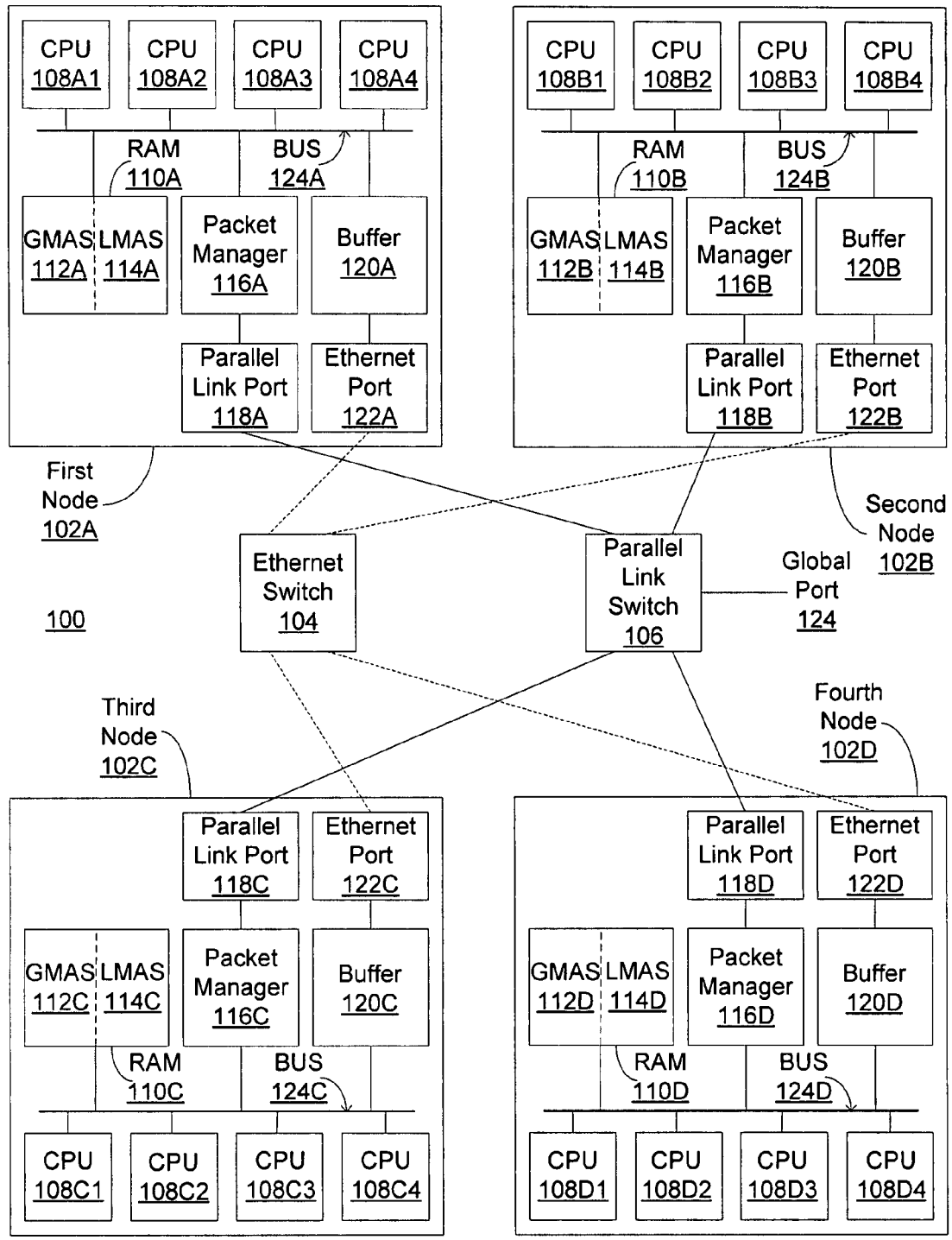
FIG. 1A is a block diagram of an apparatus including a plurality of nodes according to an example embodiment.

FIG. 1A is a block diagram of an apparatus 100 including a plurality of nodes 102A, 102B, 102C, and 102D according to an example embodiment. The apparatus 100 may, for example, include a computing system, such as a high-performance computing system, which may utilize a shared logical memory space that is created from physical memory resources of the nodes 102A, 102B, 102C, and 102D. Addresses in the shared logical memory space may be, for example, mapped to a global memory address space.

In the example embodiment shown in FIG. 1A, the apparatus 100 includes four nodes 102A, 102B, 102C, and 102D. However, the apparatus 100 may include any number of nodes, such as two nodes, four nodes, sixteen nodes, et cetera. The apparatus 100 may also include a plurality of pods (not shown). Each pod may include a plurality of nodes 102. For example, the apparatus 100 shown in FIG. 1A may include a first pod that may include a first node 102A of the first pod and a second node 102B of the first pod, and a second pod may include a first node and a second node. Other numbers of pods, as well as other numbers of nodes per pod, including pods each including a different number of nodes, may be included in other embodiments of the apparatus 100.

Each node 102A, 102B, 102C, and 102D may operate under an independent operating system, such as Linux, according to an example embodiment. Each node 102A, 102B, 102C, and 102D may also be associated with an IP address and/or a medium access control (MAC) address, according to an example embodiment. The IP address and/or the MAC address associated with each node 102A, 102B, 102C, and 102D may include a node ID and/or a pod ID of the node. For example, a fifth node in a fourth pod may be associated with an IP address such as '192.128.4.5,' where '4' is the pod ID associated with the pod which includes the node, and '5' is the node ID associated with the node. Similarly, the same node may be associated with an Ethernet address such as '/OUIF45,' where '4' is the pod ID associated with the pod that includes the node, and '5' is the node ID associated with the node.

The apparatus 100 may be configured to route data, such as data formatted into frames (discussed with reference to FIGS. 3A and 3B), between the nodes 102. The apparatus 100 may also be configured to send and receive data from the apparatus 100 to devices outside the apparatus 100, such as through a network (not shown). The apparatus 100 may, for example, send and receive data through the Internet, using protocols such as TCP/IP, according to an example embodiment.

The apparatus 100 may, for example, include an Ethernet switch 104. The Ethernet switch 104 may be configured to route data between the nodes 102. The Ethernet switch 104 may route data between the nodes 102 according to any of various Ethernet protocols such as switched Ethernet, fast Ethernet, gigabit Ethernet, or 10 gigabit Ethernet. The Ethernet switch 104 may route data based on a MAC address or IP address which includes the node ID, discussed above.

The apparatus 100 may include a parallel link switch 106. The parallel link switch 106 may utilize a parallel link technology utilizing a plurality of parallel data pins, such as HyperTransport or PCI Express, for example. The parallel link switch 106 may be configured to route data between the nodes 102. The parallel link switch 106 may route the data between the nodes according to a parallel link technology protocol, such as the HyperTransport protocol or PCI Express protocol, according to example embodiments. The parallel link switch 106 may route the data, which may be formatted into frames, between the nodes 102 based on a routing header prepended onto the frames. The routing header is discussed further with reference to FIGS. 3B-3F. According to an example embodiment, the parallel link switch 106 may replace the Ethernet switch 104. In such an example, the apparatus 100 may include the parallel link switch 106 but not the Ethernet switch 104.

Each node 102 may include at least one central processing unit 108 (CPU). Sixteen distinct CPUs are shown in FIG. 1A. CPUs 108A1, 108A2, 108A3, and 108A4 are associated with node 102A. CPUs 108B1, 108B2, 108B3, and 108B4 are associated with node 102B. CPUs 108C1, 108C2, 108C3, and 108C4 are associated with node 102C. CPUs 108D1, 108D2, 108D3, and 108D4 are associated with node 102D. For convenience, the suffixes of the reference numerals that refer to the CPUs may, at times, be omitted.

As shown in FIG. 1A, each node 102A, 102B, 102C, and 102D can include four CPUs 108. Each CPU 108 may be configured to perform operations on data, such as writing frames to memory, for example. The CPUs 108 may be configured to write the frames to memory in an Ethernet format, such as by writing frames that include a header that includes a destination MAC address and a source MAC address.

In an example embodiment, the CPUs 108, which may be considered to be examples of a protocol engine, may retrieve data, such as data written in an Ethernet format by software (not shown), from local memory (discussed below), and may send the data to a port (discussed below) with instructions to prepend a routing header onto the frame (discussed with reference to FIGS. 3B-3F). Or, the CPUs 108 may instruct another protocol engine, such as a packet manager (discussed below), node controller (discussed with reference to FIG. 1B), or a data mover (also discussed with reference to FIG. 1B), to retrieve the data, which may be written in the Ethernet format, from local memory, and send the data to the port with instructions to prepend the routing header onto the frame. Instructing another protocol engine to perform these tasks may reduce the work load on the CPUs 108.

Each node 102A, 102B, 102C, and 102D may include a random access memory (RAM) device 110A, 110B, 110C, and 110D, respectively, coupled to the CPUs 108 that are associated with the node. Each RAM 110A, 110B, 110C, and 110D may be partitioned into a global memory address space 112A, 112B, 112C, and 112D and a local memory address space 114A, 114B, 114C, and 114D, respectively. The local memory address space 114A of the first node 102A may be accessible only to the CPUs 108A1-4 of only the first node 102A, whereas the global memory address space 112A of the first node 102A may be accessible to the all sixteen CPUs 108 of the nodes 102A, 102B, 102C, and 102D included in the apparatus 100.

The global memory address space 112A of the first node 102A may be made accessible to all sixteen CPUs 108 by loading a distributed memory manager into the operating system or kernel as a driver. Each global memory address space 112A, 112B, 112C, and 112D may be associated with a global memory address, according to an example embodiment. The global memory address space 112A, 112B, 112C, and 112D may be configured to receive data routed to respective node 102A, 102B, 102C, and 102D which includes the global memory address. According to this embodiment, messages sent over a network may be routed to the global memory address space 112 based on the global memory address.

The physical memory address spaces of the RAM 110 of each node 102 may be divided into the global memory address space 112 and the local memory address space 114. The local memory address space 114 of a node may, for example, include addresses from 0 to 0x00_FFFF_FFFF for sixty-four gigabytes of memory. The global memory address space 112 may include addresses prefixed with the node ID of the node 102, such as 0xN0_0000_0000 for node N. The global or shared memory addresses for all nodes 102 in the apparatus 100 may range from $0xN0_{13}$ 0000_0000 to 0xM0_0000_0000, in the example where N, M range from zero to fifteen for the example of sixteen nodes 102. Node N could access that portion of the shared memory contributed by node M by issuing a request (or read command, discussed with reference to FIGS. 3E and 3F) with the address in the range of 0xM0_0000_0000 to 0xM0_FFFF_FFFF, according to an example embodiment. The global or shared memory address may identify a physical region or buffer within the global memory space 112. The pods, which each include a plurality of nodes 102, may or may not share the global memory with each other.

Each node 102 may also include a packet manager 116 coupled to the CPUs 108, to the RAM 110, and to a parallel link port 118 associated with the node. The packet manager 116 may be an example of a protocol engine. For example, node 102A may include a packet manager 116A coupled to the CPUs 108A1, 108A2, 108A3, and 108A4, to the RAM 110A, and to a parallel link port 118A. The packet manager 116 for a node may include a direct memory access (DMA) engine, according to an example embodiment. The packet manager 116 of a node may, for example, retrieve, from the local memory address space 114 of the node, data frames that were written to the local memory address space 114 by a CPU 108 of the node. The data may have been written to the local memory address space 114 in an Ethernet format by software, according to an example embodiment.

According to an example embodiment, the packet manager 116 of one node 102, such as the first node 102A, may be configured to instruct a parallel link input/output port to prepend a routing header onto a data frame, and thereby write the frame through the parallel link input/output port 118A to the global memory address space (e.g., 112B, 112C, or 112D) that is physically located in a random access memory (e.g., 110B, 110C, or 110D) of another node (e.g., 102B, 102C, or 102D). The packet manager 116A may, for example, write the frame to the global memory address space 112B, 112C, or 112D that is physically located in the random access memory device 110B, 110C, or 110D of another node 102B, 102C, or 102D based on the node ID associated with the other node 102B, 102C, or 102D included in the routing header of the frame, or based on the frame including a global memory address.

According to another example embodiment, the packet manager 116 may retrieve data, such as data written by software in an Ethernet format, from the local memory 114, and send the data to a parallel link port (discussed below) with instructions to prepend a routing header (discussed with reference to FIGS. 3B-3F) onto the data. The packet manager 116 may perform these tasks in response to an instruction from the CPU 108, according to an example embodiment.

Each node 102 may also include the parallel link input/output port 118 coupled to the packet manager 116 and the parallel link switch 106, according to an example embodiment. For example, node 102A can include a parallel link input/output port 118A. The parallel link port 118 of a node may route frames between the packet manager 116 of the node and the parallel link switch 106. The parallel link port 118 may utilize a parallel link technology, such as multiple pins for multiple parallel data channels, according to an example embodiment. The parallel link port 118 may be configured to send and receive data, such as data formatted into frames, from the global memory address space 112 comprised by the RAM 110 of other nodes 102. The parallel link port 118 may include a Hypertransport port or a PCI Express port, according to example embodiments.

The parallel link port 118 may prepend a routing header onto data according to instructions from the CPU 108, packet manager 116, data mover (discussed below), or node controller (discussed below). The parallel link port 118 may also frame the data. The parallel link port 118 may then send the frame to the parallel link switch 106, according to an example embodiment. The parallel link port 118 may also receive frames from the parallel link switch 106, strip the routing header from the frame, and send the frame to the node controller, data mover, packet manager 116, CPU 108, local memory 114, or global memory 112, according to example embodiments. After the frame has been written to the local memory 114 or global memory 112 in Ethernet format after having the routing header stripped from the frame, the frame may appear to the software to have been routed according to Ethernet protocols.

The parallel link port 118 of a node may facilitate the receipt of data from other nodes 102. For example, the parallel link port 118 of a node may receive a frame that is sent by another node 102, strip a prepended routing header from the frame, and route the frame to the global memory address space 112 of the RAM 110 comprised by the node 102 in which the parallel link port resides if the prepended routing header includes a global memory address associated with the global memory address space 112 of the RAM 110 comprised by the node 102. If the prepended routing header does not include an address associated with the global memory address space 112, the packet manager 116 may discard the frame, according to an example embodiment.

If the frame is written to the local memory address space 114A of node 102A by the CPU 108A in an Ethernet format, then the frame, after having the routing header stripped by the parallel link port 118B, 118C, or 118D of another node 102B, 102C, or 102D and routed to the global memory address space 112B, 112C, or 112D of the other node, may appear to the CPU 108B, 108C, or 108D or software of the other node to be an Ethernet frame. The packet managers 116A, 116B, 116C, or 116D, parallel link ports 118A, 118B, 118C, or 118D, and parallel link switch 106 may thereby be used to emulate Ethernet protocols by transmitting frames between the nodes which appear to the CPUs 108 to be Ethernet frames. However, embodiments described herein and their variants may provide shorter latency and higher bandwidth for sending frames between nodes 102 than Ethernet devices.

Each node 102 may also include a buffer 120. For example, node 102A can include a buffer 120A. The buffer 120 may be coupled to the CPUs 108, the RAM 110, the packet manager 116, and an Ethernet port 122 of the node. The buffer 120 may be configured to act as an intermediary between the Ethernet port 122 and the CPU 108 and/or the RAM 110 of the node.

Each node 102 may also include the Ethernet port 122. For example, node 102A can include an Ethernet port 122A. The Ethernet port 122 of a node may be coupled to the buffer 120 and to the Ethernet switch 104 of the node. The Ethernet port 122 may be configured to route data, such as data formatted into Ethernet frames, into and out of the node 102, such as between the node 102 and the Ethernet switch 104. The Ethernet port 122 may utilize any of various Ethernet protocols such as switched Ethernet, fast Ethernet, gigabit Ethernet, or 10 gigabit Ethernet, according to example embodiments.

According to another example embodiment, a node 102 may not include a buffer 120, and the Ethernet port 122 of the node may be coupled to the Ethernet switch 104, the CPUs 108, the RAM 110, and the packet manager 116 of the node.

A node 102 may also include a bus 124. For example, node 102A can include a bus 124A. The CPUs 108, the RAM 110, the packet manager 116, and the buffer 120 of the node may be coupled to each other via the bus 124. The bus 124 may facilitate routing data between the CPUs 108, the RAM 110, the packet manager 116, and the buffer 120 of a node, according to an example embodiment.

In an example embodiment, the parallel link switch 106 may include a global port 126. The global port 126 may be configured to receive data frames based on a global address included in the frames that corresponds to a global address of one of the global memory address spaces 112. The global port 126 of the parallel link switch 106 may be connected to a network, according to an example embodiment. In this example, the parallel link switch 106 may be configured to route a received frame to one of the nodes 102A, 102B, 102C, and 102D based on a global memory address included in the frame that corresponds to a global address associated with the node 102A, 102B, 102C, and 102D.

Figure 1B:
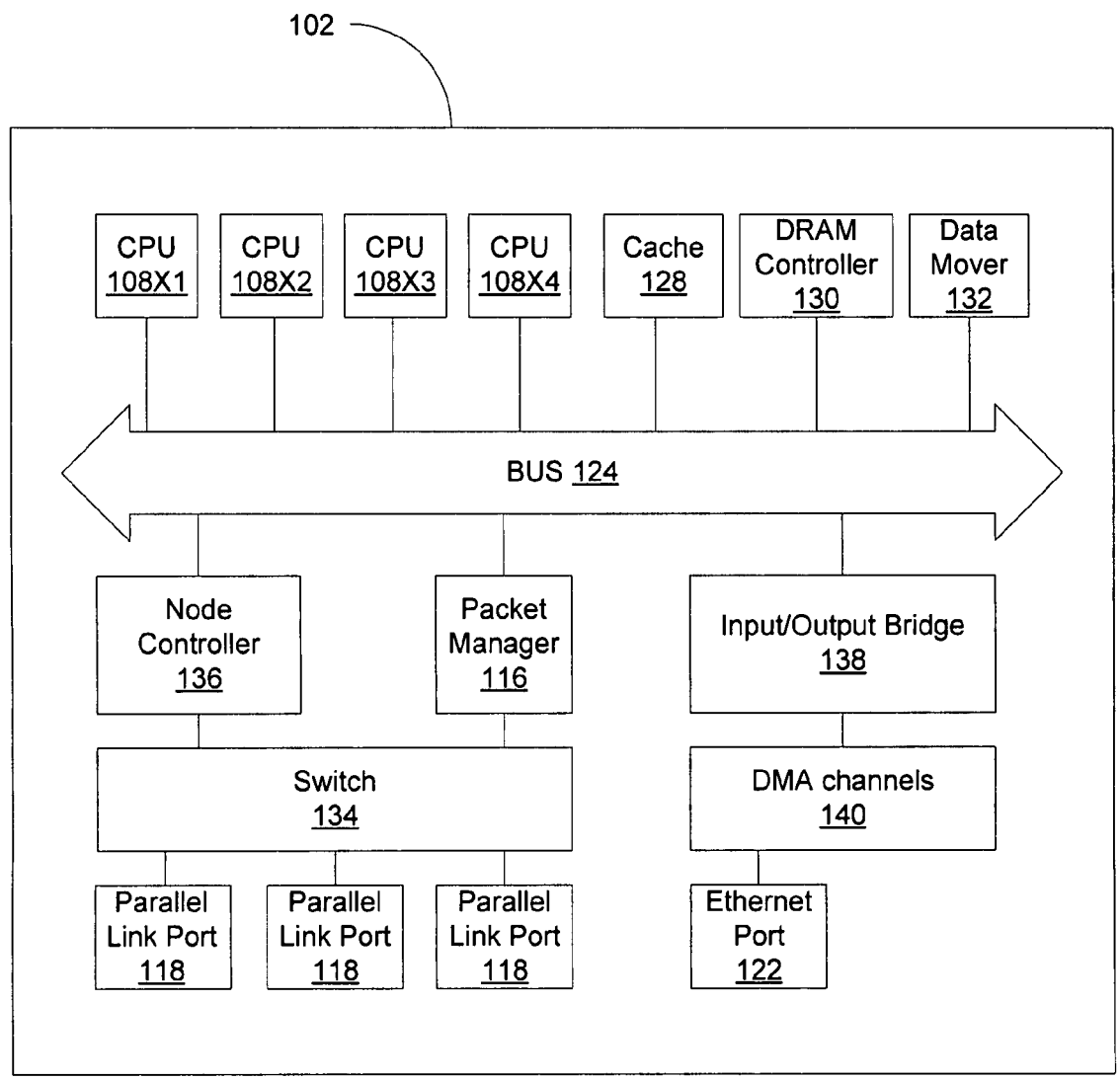
FIG. 1B is a block diagram showing one of the plurality of nodes according to another example embodiment.

FIG. 1B is a block diagram showing details of a node 102, according to another example embodiment. The node 102 may include a Broadcom (BCM) 1480 chip, according to an example embodiment. In this example, the plurality of CPUs 108X1, 108X2, 108X3, and 108X4 and the packet manager 116 may be coupled to the bus 124. The CPUs 108X1, 108X2, 108X3, and 108X4 may include L1 caches and instruction caches. The bus 124 may include a low-swing differential ZB bus, according to an example embodiment.

This example may also include a cache 128 coupled to the bus 124. The cache 128 may include an L2 cache which may function as a front-end cache to the RAM 110 (not shown in FIG. 1B). The cache 128 may allocate space for received data according to a controllable allocation policy.

The node 102 may also include a DRAM controller 130 coupled to the bus 124. The DRAM controller 130 may control access to, and functions performed by, the RAM 110. The DRAM controller 130 may be coupled to the RAM 110, according to an example embodiment.

The node 102 may also include a data mover 132 coupled to the bus. The data mover 132 may be an example of a protocol engine, and may include a DMA engine, such as a versatile high-performance four-channel DMA engine. The data mover 132 may free the CPUs 108X1, 108X2, 108X3, and 108X4 from moving data between source and destination locations in the global memory address space 112 and/or the local memory address space 114. The data mover 132 may enable data transfer between input/output devices and between nodes 102. The data mover 132 may thereby enable data to be copied to a remote device's memory by specifying the remote user. The data mover 132, which may include a TCP offload engine in an example embodiment, may also support data-touching functions by calculating a checksum and cyclic redundancy code digest for arbitrary protocol data units. This may relieve the CPUs 108X1, 108X2, 108X3, and 108X4 from processing data, according to an example embodiment.

For example, the data mover 132 may retrieve data from the global memory address space 112 or local memory address space 114 and send the data to the parallel link port 118 with instructions to prepend a routing header onto the data. As discussed above, the data may have been written to memory by software in an Ethernet format. The data mover 132 may perform these tasks in response to instructions from the CPU 108, according to an example embodiment. The data mover 132 may also receive a frame from the parallel link port 118 and write the frame to the memory, according to an example embodiment. According to another example embodiment, the parallel link port 118 may write the frame directly to memory in Ethernet format; in either example, the software may see only the Ethernet frame, and the software may view the data as being sent according to Ethernet protocols.

In the example shown in FIG. 1B, the node 102 may include a plurality of, such as three, parallel link ports 118. The parallel link ports 118 each may be coupled to a switch 134, which in turn may be coupled to the packet manager 116 and to a node controller 136. The parallel link ports 118 may also be coupled to the parallel link switch 106 (shown in FIG. 1A).

The node controller 136 may be coupled to the switch 134 and to the bus 124; in an example embodiment, the node controller 136 may be combined with the packet manager 116, and the combination may be referred to as the packet manager 116. The node controller 136 may handle input-output access through the parallel link ports 118, according to an example embodiment. The node controller 136 may implement a write-invalidate directory-based protocol to support cache coherence among multiple nodes 102. The node controller 136 may instruct the node 102 to monitor only those local memory lines that are cached remotely. The node controller 136 may achieve this limited monitoring by using a directory such as a remote line directory (RLD). The RLD entry may be allocated for a memory line when a remote node 102 requests the memory line, and may be de-allocated when all remotely cached copies are invalidated, according to an example embodiment. Each RLD entry may contain a vector of presence bits corresponding to each node 102 in the apparatus 100. Each presence bit may indicate whether the corresponding node 102 has a copy of a memory block (each copy may be identical to the copy in the originating node 102). The RLD entry may also include dirty bits indicating whether a dirty cached copy exists. If a dirty cached copy exists, the protocol may require that only one node hold a cached copy, and may achieve this by sending invalidations to nodes 102 which correspond to bits indicating the presence of dirty cached copies.

The coherence protocol may include a four-leg protocol, according to an example embodiment. In response to a request for a copy along a memory line, the node 102 with the copy may write a dirty line back to a home node 102, and the home node 102 may forward the data to the requesting node 102. The home node 102 may collect acknowledgments to invalidation requests and provide data to the requesting node 102 upon completion.

The node 102 may also include an input/output bridge 138 coupled to the bus 124 and to DMA channels 140. The DMA channels 140 may be coupled to the Ethernet port 122. The DMA channels 140 may include a plurality of transmit and receive DMA channels, according to an example embodiment. The DMA channels 140 may transfer packets to memory, according to an example embodiment. The Ethernet port 122 may be coupled to the Ethernet switch 104 (shown in FIG. 1A).

Figure 2:
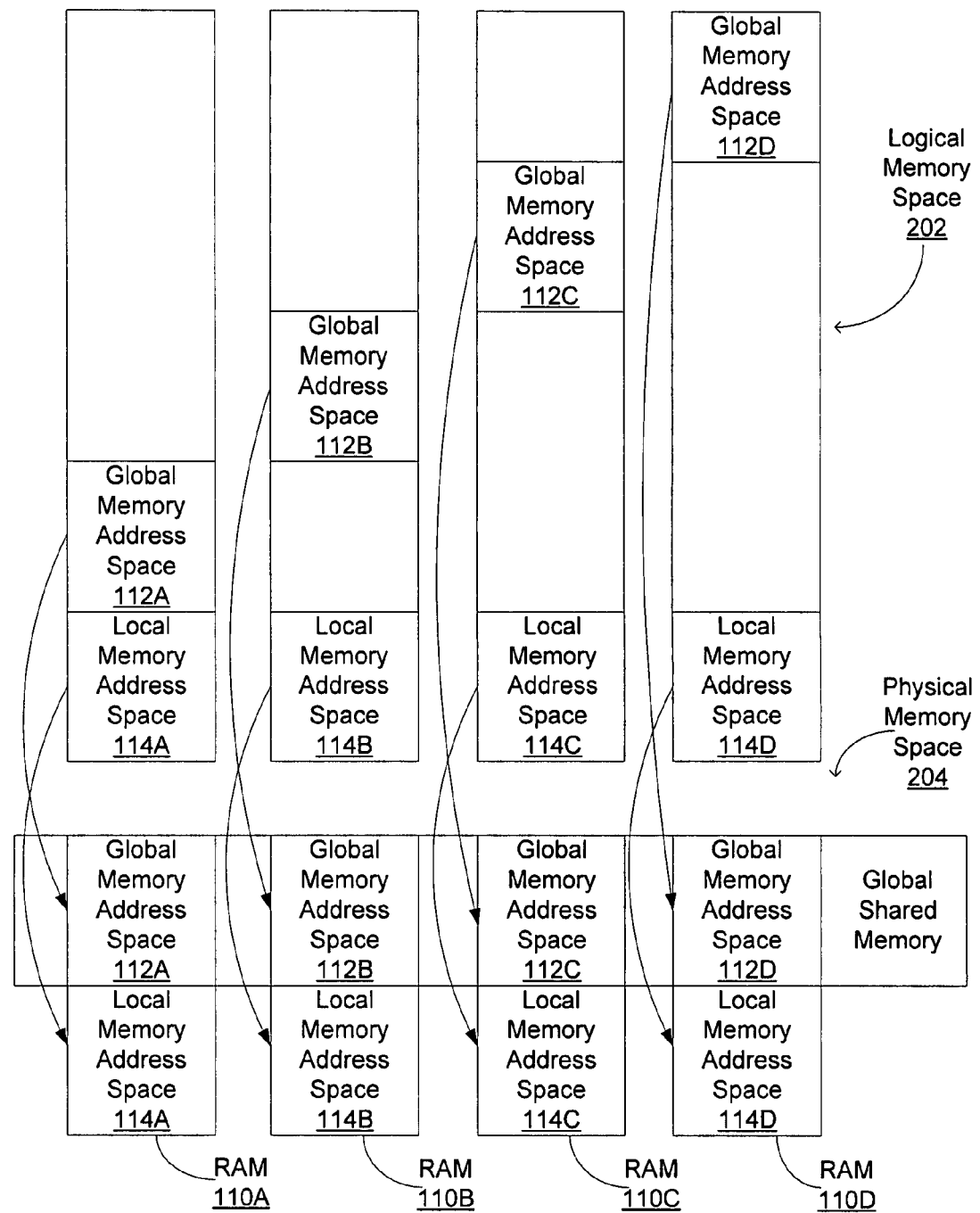
FIG. 2 is a block diagram showing logical memory space and physical memory space of the apparatus of FIG. A according to an example embodiment.

FIG. 2 is a block diagram showing relationships between logical memory spaces 202 and physical memory spaces 204 of the apparatus 100 of FIG. 1A according to an example embodiment. As shown in the example embodiment of FIG. 2, the global memory may be mapped into a number of logical levels equal to the number of nodes 102. For example, the first node 102A may contribute its global memory address space 112A to a first level of the logical memory space 202, the second node 102B may contribute its global memory address space 112B to a second level of the logical memory space 202, the third node 102C may contribute its global memory address space 112C to a third level of the logical memory space 202, and the fourth node 102D may contribute its global memory address space 112D to a fourth level of the logical memory space 202. The local memory address spaces 114A, 114B, 114C, and 114D may be reserved by the respective nodes 102A, 102B, 102C, and 102D, and not contributed to the global memory.

The global memory address space 112A, 112B, 112C, and 112D mapped in the logical memory space 202 may correspond to the global memory address space 112A, 112B, 112C, and 112D included in the physical memory space 204. The physical memory space 204, which may include both the global memory address space 112A, 112B, 112C, and 112D and the local memory address spaces 114A, 114B, 114C, and 114D, may be included in each of the nodes 102A, 102B, 102C, and 102D (shown in FIG. 1A), according to an example embodiment.

The global memory address space 112 may be managed by a distributed memory manager, according to an example embodiment. The distributed memory manager may be loaded onto the operating system as a driver and designated with a unique node ID. The global memory may thereby be accessed by the global memory address, such as the global memory address discussed in paragraph [0028].

According to an example embodiment, the local memory address spaces 114A, 114B, 114C, and 114D may be known to and available to the operating system, such as the Linux kernel, of the node 102A, 102B, 102C, and 102D that includes the particular local memory address space. The global memory address space 112, however, may be hidden to the operating system, such as the Linux kernel, of the node 102 which includes the global memory address space 114; the physical association between the global memory address space 112 and the node 102 within which the global memory address space is included may thereby be unknown to the operating system of the node 102, making the global address space 112 within the node 102 indistinguishable (other than by the global address) to the operating system of the node 102 from the global address space 112 of other nodes 102 or global address spaces outside the apparatus 100.

While four levels of logical memory space 202 are shown in FIG. 2, the logical memory space 202 may include other numbers of levels in other embodiments. The number of levels of logical memory space 202 may correspond to the number of nodes 102 in the apparatus 100.

Figure 3A:
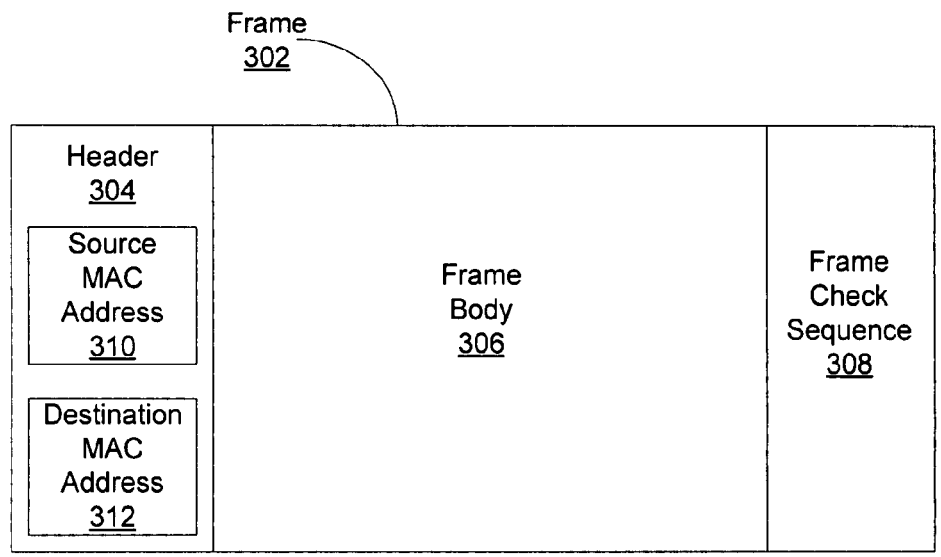
FIG. 3A is a block diagram of a frame according to an example embodiment.

FIG. 3A is a block diagram of a frame 302 according to an example embodiment. The example frame 302 shown in FIG. 3A may have a format of an Ethernet frame. The frame 302 may have been written to the local memory address space 114 by a CPU 108 using software, and may be received by the software.

The example frame 302 shown in FIG. 3A includes a header 304, a frame body 306, and a frame check sequence (FCS) 308. The header 304 may include routing information, such as a source MAC address 310 and a destination MAC address 312, according to an example embodiment. The frame body 306 may include data to be transmitted from one device, such as a node 102, to another device. The FCS 308 may include error detection data, such as a checksum of the previous bits in the frame 302.

Figure 3B:
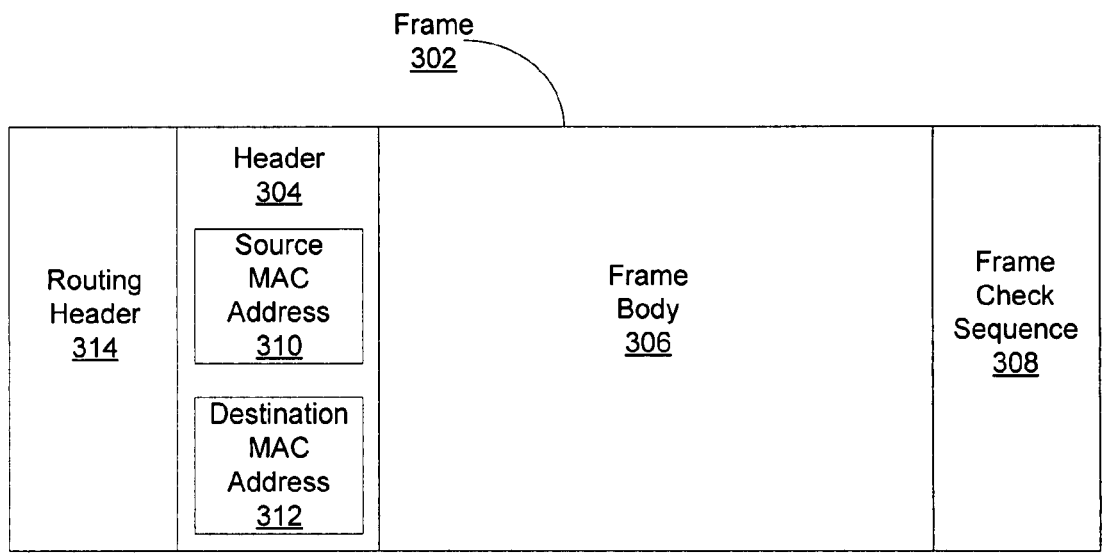
FIG. 3B is a block diagram of the frame with a routing header prepended onto the frame according to an example embodiment.

FIG. 3B is a block diagram of the frame 302 with a routing header 314 prepended onto the frame 302 according to an example embodiment. The routing header 314 may have been prepended onto the frame 302 by the packet manager 116, according to an example embodiment; the packet manager 116 may also strip the routing header 314 off of a received frame 302. According to another example embodiment, the routing header 314 may have been prepended onto the frame 302 by the parallel link port 118; the parallel link port may have prepended the routing header 314 onto the frame 302 according to instructions from a protocol engine such as the CPU 108, packet manager 116, or data mover 132. The parallel link port 118 may also strip the routing header 314 off of the frame 302. The routing header 314 may include routing data which may be used by the parallel link switch 106 to route the frame 302 according to parallel link technology protocols, such as the HyperTransport protocol or the PCI Express protocol, according to example embodiments.

FIGS. 3C-3F are block diagrams of the routing header 314 according to four example embodiments. The routing header 314 may include a plurality of fields, such as a destination node ID 316, a command type 318, and a command-sensitive field(s) 320, according to an example embodiment. According to an example embodiment, a selected one of a plurality, such as four, types of routing headers 314A, 314B, 314C, 314D may be prepended onto the frame 302. The type of routing header 314 may be determined by the command type, according to an example embodiment. The command types may include packet, write, read, and read response, according to an example embodiment.

The destination node ID field 316 may include the node ID of the node 102 to which the frame 302 is to be sent. The parallel link switch 106 may route the frame 302 to the destination node 102 based on data included in the destination node ID field 316, according to an example embodiment.

The command type field 318 may include a command type, such as packet, write, read, or read response, according to an example embodiment. The command type may be determined by the protocol engine, and the command type field 318 may be filled by the parallel link port 118 according to instructions from the protocol engine, according to an example embodiment. The command sensitive field 320 may include fields which are dependent upon the command type.

Figure 3C:
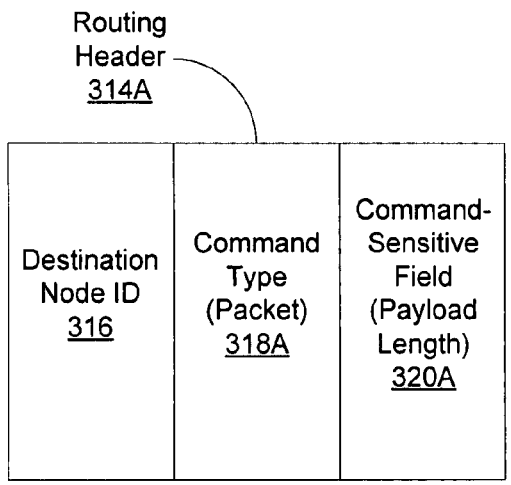
FIGS. 3C-3F are block diagrams of the routing header according to four example embodiments.

FIG. 3C shows a packet routing header 314A, according to an example embodiment. The packet routing header 314A may be prepended onto a frame 302 which is to be sent to a node 102 without instructions to write the frame 302 to a particular region of the global memory address space 112. The command type field 318A may indicate a packet. The command-sensitive field 320A may indicate a payload length. The packet routing header 314A may be prepended onto the frame 302 by the parallel link port 118 according to instructions from the packet manager 116, according to an example embodiment.

In this example, the frame 302 with a packet routing header 314A may be received by the receiving node 102, and the receiving node 102 may decide where to store the frame 302. The parallel link port 118 of the receiving node 102 may, for example, strip the packet routing header 314A from the frame 302, and send the frame 302 to the packet manager 116 based on the command type field 318A indicating that the header 302 is a packet routing header 314A, according to an example embodiment. The packet manager 116 may have maintained a list of addresses of buffers or regions of memory in either the global memory address space 112 or local memory address space 114, according to an example embodiment. The packet manager 116 may write the received frame 302 to a buffer or region of memory in the list. The packet manager 116 may invoke the software driver, which may pass the frame 302 up from the buffer or region of memory up through a TCP/IP protocol stack. The software may only see Ethernet frames, causing the software to view the data as being routed according to Ethernet protocols.

In another example embodiments, the tasks described above as performed by the packet manager 116 may be performed by the CPU 108 or the data mover 132.

Figure 3D:
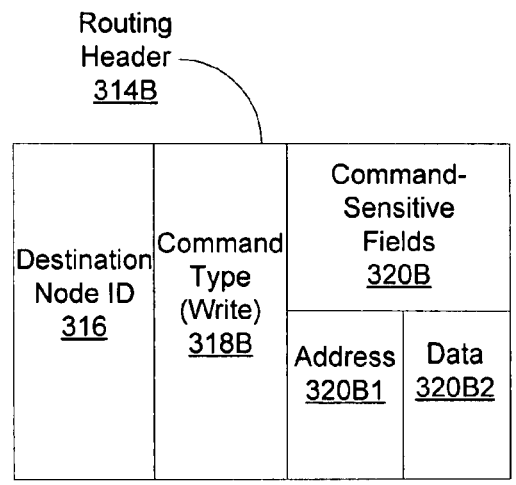

FIG. 3D shows a write routing header 314B, according to an example embodiment. The write routing header 314B may be prepended onto a frame 302 which is to be sent to a node 102 with instructions to write the frame 302 to a particular region of the global memory address space 112. The command type field 318B may indicate a write command. The command-sensitive field 320B may include an address field 320B1 and a data field 320B2. The address field 320B1 may include a global memory address of the receiving node 102. The data field 320B2 may include data to be written to the global memory address space 112 of the receiving node 102.

The write routing header 314B may be prepended onto the frame 302 by the parallel link port 118 according to instructions from the data mover 132 or the CPU. The parallel link switch 106 may route the frame 302 to another node 102 based on a node ID included in the destination node ID field 316. The parallel link port 118 of the receiving node 102 may strip the write routing header 314B from the frame 302, and may pass the write command and the data included in the data field 320B2, or the frame 302 without the write routing header, to the node controller 136 or packet manager 116 of the receiving node 102. The node controller 136 may write the data to the portion of the global memory address space 112 designated by the global memory address included in the address field 320B1. The software driver may read the data as an Ethernet frame, causing the software to view the data as being routed according to Ethernet protocols. The write routing header 314B may allow data to be written to a node 102 according to a "push" model, according to an example embodiment.

Figure 3E:
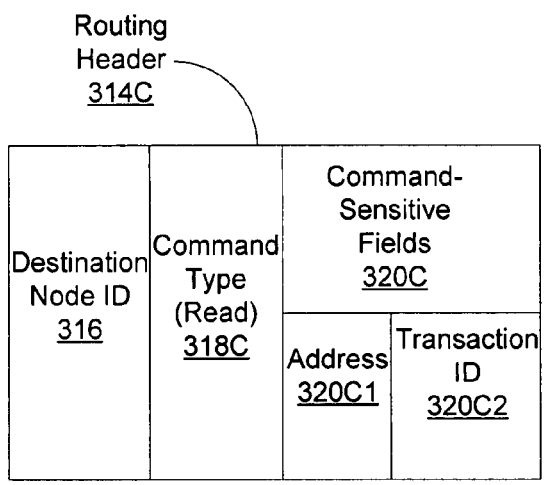

FIG. 3E shows a read routing header 314C, according to an example embodiment. The read routing header 314C may be prepended onto a frame 302 which is to be sent to a node 102 with instructions to write a frame 302 to a particular region of the global memory address space 112 of the node 102 which sent the read routing header 314C. The command type field 318C may indicate a read command. The command-sensitive field 320C may include an address field 320C1 and a transaction ID field 320C2. The address field 320C1 may include a global memory address from which data should be fetched by the node 102 which receives the read routing header 314. The transaction ID field 320C2 may include a transaction ID which is used to match data sent with a read response routing header 314D to the read routing header 314C to which the data were sent in response.

Figure 3F:
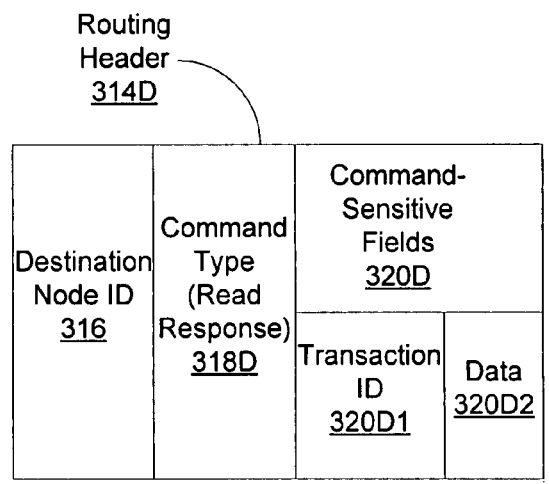

FIG. 3F shows the read response routing header 314D, according to an example embodiment. The read response routing header 314D may be prepended onto a frame which is sent to a node 102 in response to a frame with a read routing header 314C. The command type field 318D may indicate a read response command. The command-sensitive field 320D may include a transaction ID field 320D1 and a data field 320D2. The transaction ID field 320D1 may include a transaction ID which is used to match the read response routing header 314D and associated frame 302 to the read routing header 314C and associated frame 302 which the read response routing header 314D and associated frame 302 are sent in response to. The data field 320D2 may include data read from the global memory address space 112 by the node 102 which received the read routing header 314C based on the address 302C1.

Figure 3G:
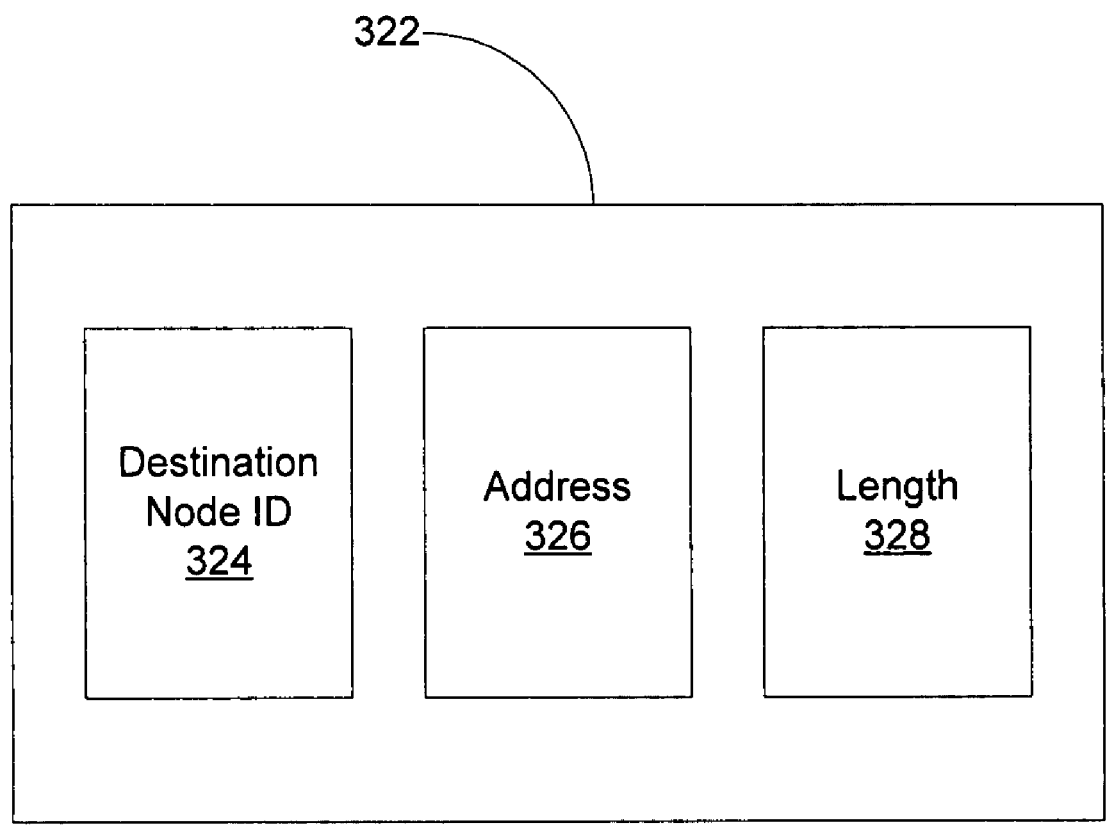
FIG. 3G is a block diagram showing a notification message.

FIG. 3G is a block diagram showing a notification message 322. The notification message 322 may include a destination node ID field 324 which may include a destination node ID used by the parallel link switch 106 to route the notification message 322 to a destination node 102B, and an address field 326 which may include an address of data in the global memory address space 112A of the sending node 102A which the sending node 102A is instructing the receiving node 102B to pull from the sending node 102A. The notification message 322 may also include a length field 328. The length field 328 may indicate how much data should be read, such as a specified number of bytes.

The notification message 322, read routing header 314C, and read response routing header 314D may be used in a "pull" model in which data are read from the global memory address space 112A of the node 102A which initiated the "pull". The node 102A may initiate the pull by sending a notification message 322 to a second node 102B. According to an example embodiment, the first node 102A may send the notification message 322 to the second node 102B. The notification message 322 may include a node ID of a second node 102B in the destination node ID field 324. The notification message 322 may also include, in the address field 326, a global memory address of data which the first node 102A is instructing the second node 102B to read. The notification message 322 may also include, in the length field 328, the number of bytes (or other measure of data) which should be pulled. The value in the length field 328 may be added to the global memory address in the address field 326 to determine an ending address of data which should be pulled; in an example embodiment, the pull operation may pull all of the data with global memory addresses between the global memory address included in the address field 326 and this address plus the value in the length field 328. All of these data may be pulled in one operation, or they may be pulled in multiple, smaller operations.

According to an example embodiment, the second node 102B may respond to the notification message 322 by sending a read frame to the first node 102A. For example, a protocol engine, such as CPU 108B or data mover 132B of the second node 102B may retrieve a frame 302 from memory, and send the frame 302 to the parallel link port 118B with instructions to prepend a read routing header 314C onto the frame 302. The parallel link port 118B may prepend the read routing header 314C onto the frame 302; the destination node ID field 316 may include a node ID of the first node 102A, and the address field 320C1 may include a global memory address of the global memory address space 112A of the first node 102A based on instructions from the address included in the address field 326 of the notification message 322 sent by the first node 102A. The parallel link port 118B may send the prepended frame 302 to the parallel link switch 106, and the parallel link switch 106 may send the prepended frame 302 to the first node 102A based on the node ID included in the node destination node ID field 316 of the read routing header 316C.

The first node 102A may receive the prepended frame 302, and in response, may send a frame 302 with a read response routing header 314D prepended onto the frame 302. A protocol engine, such as the CPU 108A or data mover 132A, of the first node 102A, may retrieve data from memory, such as a frame 302 in an Ethernet format. The protocol engine may send the data or frame to the parallel link port 118A along with instructions to prepend a read response routing header 314D onto the frame 302. The parallel link port 118A may prepend the read response routing header 314D onto the frame 302, and send the prepended frame 302 to the parallel link switch 106. The transaction ID field 320D1 may include the same transaction ID as was included in the transaction ID field 320C1 of the read routing header 314C, based on the instructions received from the protocol engine, and the data field 320D2 may include data retrieved from the global memory address space 112A of the first node 102A based on the address included in the address field 326 and the length included in the length field 328 of the notification message 322. In the case of multiple pulls, the data included in a read response routing header 314D may be identified based on the transaction ID, which may be an identical transaction ID in both the transaction ID field 320C2 of the read routing header 314C and the transaction ID field 320D 1 of the read response routing header 314D; in an example embodiment, in the case of multiple read commands and read response commands, the data may be read from the appropriate portion of the global memory address space 112A based on matching the transaction IDs included in the read routing headers 314C and the read response routing headers 314D.

The parallel link switch 106 may send the prepended frame 302 to the second node 102B based on the node ID included in the destination node ID field 316 included in the read response routing header 314D. The parallel link port 118B of the second node 102B may strip the read response routing header 314D from the frame 302 and, based on the read response indicated by the command type field 314D, send the frame 302 to the node controller 136B or packet manager 116B of the second node 102B. The node controller 136B or packet manager 116B may write the data included in the data field 320D2 to a portion of either the global memory address space 112B or the local memory address space 114B. The second node 102B may associate the data included in the data field 320D2 with the prepended frame 302 that included the read routing header 314C based on the transaction ID included in the transaction ID field 320D1 matching the transaction ID included in the transaction ID field 320C2 of the read routing header 320C.

Figure 4:
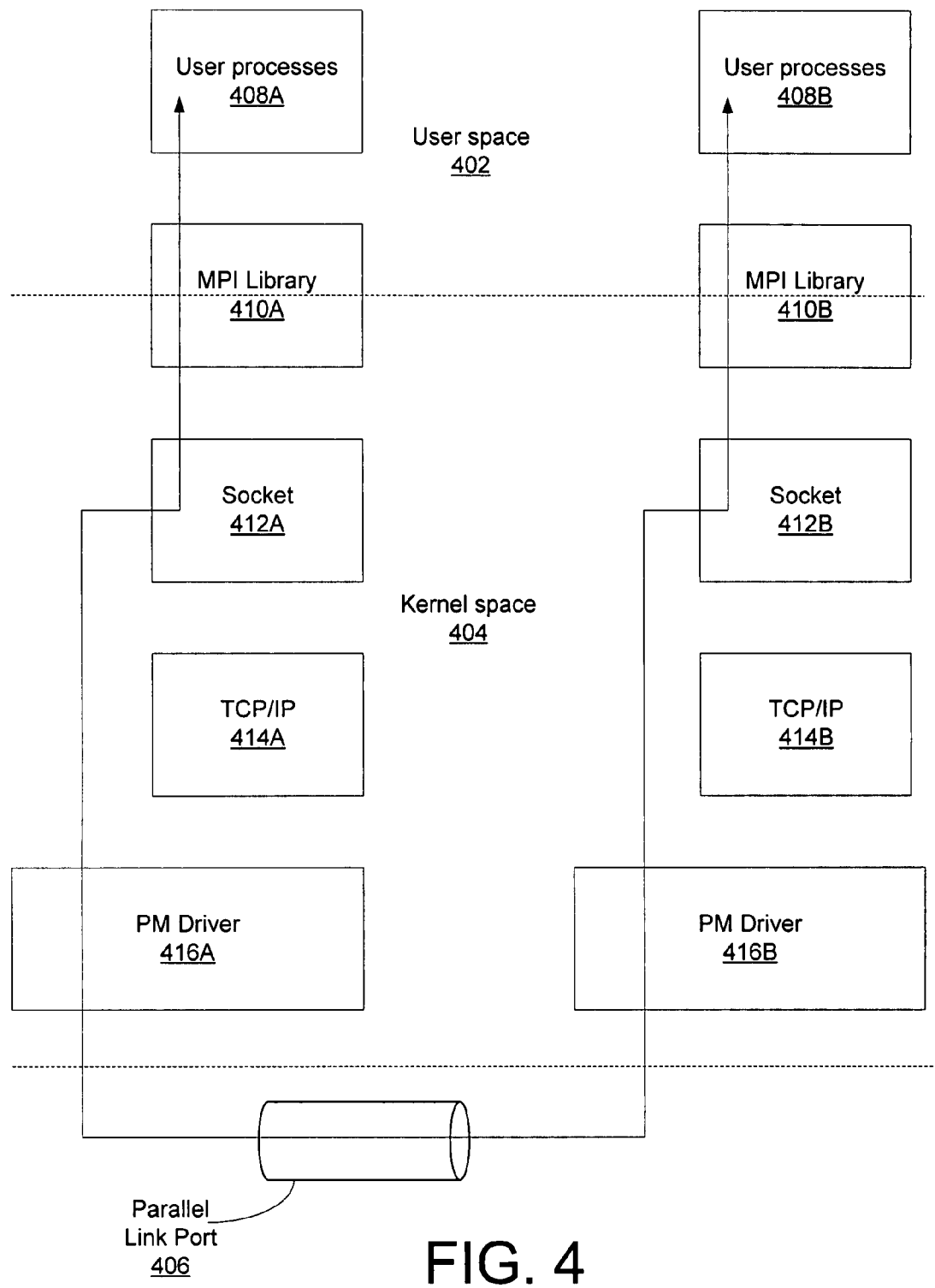
FIG. 4 is a block diagram showing protocol levels which the frame may pass through or bypass.

FIG. 4 is a block diagram showing protocol levels which the frame 302 may pass through or bypass. The protocol levels may be divided into a user space 402 and a kernel space 404, according to an example embodiment.

The user space 402 may include a user processes layer 408. A message passing interface (MPI) library 410 may be included in both the user space 402 and the kernel space 404.

The kernel space 404 may also include a socket layer 412, a TCP/IP layer 414, and a packet manager (PM) driver layer 416.

A frame 302 sent from, for example, the first node 102A to the second node 102B may, for example, originate in the user processes layer 408A. The frame 302 may proceed from the user processes layer 408A through the MPI library 410A to the socket layer 412A. By use of the packet manager 416A and the parallel link port 118A, the frame 302 may bypass the TCP/IP layer 414A, and proceed through the PM driver 416A to the parallel link port 406, according to an example embodiment. The frame 302 may travel from the parallel link port 406 through the PM driver 416B of the second node 102B, and bypass the TCP/IP layer 414B to the socket layer 412B. The frame 302 may travel from the socket layer 412B through the MPI library 410B to the user processes layer 408B, according to an example embodiment.

According to an example embodiment, a memory manager, such as a distributed memory manager, may be loaded onto each of a plurality of kernels or operating systems of nodes 102 as a driver. The memory manager may partition the memory 110 of each of the nodes 102 into a local memory 114 accessible only to the node 102 of which the memory 110 is a component, and a global memory 112 accessible to all the nodes 102. The memory manager may allow each node 102 to read data directly from, or write data directly to, the global memory 112 of the other nodes 102.

According to an example embodiment, the memory manager may allow each node 102 to send a packet, such as a frame 302 with a packet routing header 314A, to the other nodes 102. In this example, the nodes 102 may, when receiving the packet, determine a portion of their memory in which to store the packet. This determination of where to store the packet may be made independently of information included in a header of the packet.

Also according an example embodiment, the memory manager may allow the nodes 102 to participate in a push process. The push process may include a first node 102A sending a write frame, such as a frame 302 with a write routing header 314B, to a second node 102B. The write frame may include a routing header 314B which includes an address and data. The second node 102B may receive the write frame from the first node 102A and store the data in a portion of the second node's 102B global memory 112 based on the address included in the routing header 314B.

According to an example embodiment, the memory manager may allow the nodes to participate in a pull process. The pull process may include a first node 102A sending any number of notification messages 322 to a second node 102B. Each notification message 322 may include an address in an address field 326. The second node 102B may receive the notification message(s) 322. In response to receiving the notification message(s) 322, the second node 102B may send a corresponding number of read frame(s), such as frame(s) 302 with read routing header(s) 314C, to the first node 102A. A header 314C of the read frame may include an address, such as in an address field 320C1, and may also include a corresponding transaction ID, such as in a transaction ID field 320C2.

The first node 102A may receive the read frame(s). In response to receiving the read frame(s), the first node 102A may send a corresponding number of read response frame(s), such as frame(s) 302 including a read response routing header 314D, to the second node 102B. The read response frame may include data stored in a portion of the first node's global memory based on the address included in the read frame. In the case of a plurality of read response frames, the read response frames may each include the transaction ID in a transaction ID field 320D2, and the data included in the read response frame may be stored in a portion of the first nodes 102A global memory based on the address corresponding to the transaction ID. The second node 102B may receive the read response frame from the first node 102A and store the data in the memory 110B of the second node.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) for use with the methods and apparatuses described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system comprising:
a plurality of nodes each operating under an independent operating system and comprising a memory including a local memory accessible to the node and a global memory accessible to all the nodes in the system;
wherein each node is configured to participate in a pull process comprising:
a first node sending a notification message to a second node, the notification message including an address;
the second node receiving the notification message and, in response to receiving the notification message, sending a read frame to the first node, the read frame including a header including the address;
the first node receiving the read frame and, in response to receiving the read frame, sending a read response frame to the second node, the read response frame including data stored in a portion of the first node's global memory based on the address; and
the second node receiving the read response frame from the first node and storing the data in the memory of the second node.

2. The system of claim 1, wherein each node is configured to read or write data directly from the global memory of the other nodes.

3. The system of claim 1, wherein each node is configured to send a packet to the other nodes, and each node is configured, when receiving the packet, to determine a portion of the memory in which to store the packet independently of information included in a header of the packet.

4. The system of claim 1, wherein each node is configured to participate in a push process comprising:
a sending node sending a write frame to a receiving node, the write frame including a routing header including an address and data; and
the receiving node receiving the write frame from the sending node and storing the data in a portion of the receiving node's global memory based on the address included in the routing header.

5. The system of claim 1, wherein the pull process comprises:
the first node sending a plurality of notification messages to the second node, each notification message including the address;
the second node receiving the plurality of notification messages and, in response to receiving the plurality of notification messages, sending a plurality of read frames to the first node, each of the plurality of read frames including the header including the address and a corresponding transaction ID;
the first node receiving the plurality of read frames and, in response to receiving the plurality of read frames, sending a plurality of read response frames to the second node, each of the plurality of read response frames including the transaction ID and the data stored in the portion of the first node's global memory based on the address corresponding to the transaction ID; and
the second node receiving the read response frame from the first node and storing the data in the memory of the second node.

6. The system of claim 1, wherein each of the plurality of nodes further includes one or more central processing units (CPUs).

7. The system of claim 1, wherein each of the plurality of nodes further includes a parallel link input/output port configured to send data frames to, and receive data frames from, the global memory comprised by the other nodes in the system.

8. The system of claim 7, wherein each node further comprises a protocol engine coupled to the parallel link input/output port, the protocol engine being configured to instruct the parallel link input/output port to prepend a routing header onto a data frame and to write the data frame to the global memory of another node.

9. The system of claim 8, wherein the protocol engine is configured to write the data frame to the global memory of another node based on a node ID associated with the other node included in the routing header of the data frame.

10. The system of claim 8, wherein the protocol engine is configured to write the data frame to the global memory of another node based on a global memory address associated with the other node included in the routing header of the data frame.

11. The system of claim 1, wherein each node is configured to write frames to its own local memory, the frames each including a header that includes a destination MAC address and a source MAC address.

12. The system of claim 1, further comprising a switch configured to route frames between the nodes based on a routing header prepended onto the frames.

* * * * *

UNITED STATES PATENT AND TRADEMARK OFFICE
CERTIFICATE OF CORRECTION

| | | |
|---|---|---|
| PATENT NO. | : 7,941,613 B2 | Page 1 of 1 |
| APPLICATION NO. | : 11/807986 | |
| DATED | : May 10, 2011 | |
| INVENTOR(S) | : Fong Pong | |

It is certified that error appears in the above-identified patent and that said Letters Patent is hereby corrected as shown below:

On the title page, item [74]: in column 2, line 1, delete "Huges" and insert -- Hughes --, therefor.

Signed and Sealed this
Fifth Day of July, 2011

David J. Kappos
*Director of the United States Patent and Trademark Office*